United States Statutory Invention Registration [19]

[11] Reg. Number: H198

Stone

[43] Published: Jan. 6, 1987

[54] EXPANDING PROJECTILE ROTATING BAND

[75] Inventor: William J. Stone, Bangor, Pa.

[73] Assignee: The United States of America as represented by the Secretary of the Army, Washington, D.C.

[21] Appl. No.: 857,276

[22] Filed: Apr. 30, 1986

Related U.S. Application Data

[63] Continuation of Ser. No. 728,971, Apr. 30, 1985, abandoned.

[51] Int. Cl.[4] ..... F42B 31/00

[52] U.S. Cl. ..... 102/524

*Primary Examiner*—Harold J. Tudor

*Attorney, Agent, or Firm*—Anthony T. Lane; Harold H. Card, Jr.; Michael C. Sachs

[57] ABSTRACT

A projectile that is to be fired through a gun tube with high pressure gas, has a central load and a jacket. The jacket encircles the load and has a rearwardly directed appendage flaring outwardly from the jacket. This appendage is formed of a flexible material for outwardly and radially deflecting in response to application of said high pressure gas.

15 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

EXPANDING PROJECTILE ROTATING BAND

GOVERNMENT INTEREST

The invention described herein may be manufactured, used and licensed by or for the government for governmental purposes without the payment to me of any royalties thereon.

This application is a continuation of Ser. No. 728,971, filed Apr. 30, 1985, now abandoned.

BACKGROUND OF THE INVENTION

The present invention relates to projectiles; and in particular to projectiles requiring a rotating band(s) to impact spin and to seal off propellant gases.

It is known to employ a rotating band on a projectile. The band can be made of a soft materials such as copper that can conform to the rifling in a gun tube, without excessively wearing the tube. When the gun is fired, high pressure gas is applied to the aft end of the projectile. As the projectile travels forward, the rotating band is squeezed into the rifling of the gun tube, so that the projectile is spun for dynamic stability during flight.

A disadvantage with known projectiles is the high cost associated with critical metals such as copper that are used in the rotating band. This expense is especially significant when the projectile is being used only for training. In the past, training has been limited due to this expense.

Also, known projectiles have had difficulty in sealing the projectiles to the gun tube so that high pressure gas drives the projectile without leaking past it. Again, the sealing devices have used critical materials which are relatively expensive.

Accordingly, there is a need for a relatively reliable and inexpensive device for engaging rifling on a gun tube, and for sealing high pressure gases so that a projectile can be fired accurately and can travel its full range.

SUMMARY OF THE INVENTION

In accordance with the illustrative embodiments demonstrating features and advantages of the present invention, there is provided a projectile for firing through a gun tube with high pressure gas. The projectile has a central load and a jacket. The jacket encircles the load, and has a rearwardly directed appendage flaring outwardly from the jacket. This appendage is formed of a flexible material for outwardly and radially deflecting in response to application of the high pressure gas.

Also, in accordance with the same invention, this projectile may have an alternate central load having an aft shoulder. Also, included is an anvil coaxially and slidably mounted behind the central load. This anvil has a forward shoulder opposing the aft shoulder of the central load. Also, the projectile includes an alternate jacket, encircling the load and having a flexible internal ridge, fitted between the forward and aft shoulders. Thus, application of the high pressure gas against the anvil, drives the aft and forward shoulders together to expand the jacket outwardly.

By employing apparatus of the foregoing type, an improved projectile is achieved. In a preferred embodiment, the projectile has a plastic jacket, for example, a hollow thermoplastic cylinder with a pointed nose. This jacket may have a flexible appendage in the form of an an annular skirt. The portion of the jacket forward of the appendage is thickened to act as a rotating band. The appendage, however, is relatively flexible, so that upon firing, high pressure gas lifts the underside of the skirt to press it against the rifling in the gun tube.

This type of jacket can be relatively inexpensive. It may be used as a training round, where the jacket contains a ballast, or a ballast together with a small amount of explosive material. Alternatively, for certain applications, the load may be a normal projectile load used in a conventional weapon.

Another preferred embodiment employs a load forward of a slidably mounted anvil. The load and the anvil have opposing annular shoulders into which are cut annular grooves. The jacket has a compementary, internal ridge that is trapped within the groove of the shoulders. When the projectile is fired, the load and anvil collapse together, squeezing the ridge to cause an outward bulging. Again, the outward bulging causes a tight gas seal, and also allows the rifling to impart a spin to the projectile.

BRIEF DESCRIPTION OF THE DRAWING

The above brief description as well as other features and advantages of the present invention will be more fully appreciated by reference to the following detailed description of a presently preferred but nonetheless illustrative embodiment in accordance with the present invention when taken in conjunction with the accompanying drawings, wherein.

DETAILED DESCRIPTION OF THE PREFERRED EMBODIMENTS

Figure 1:
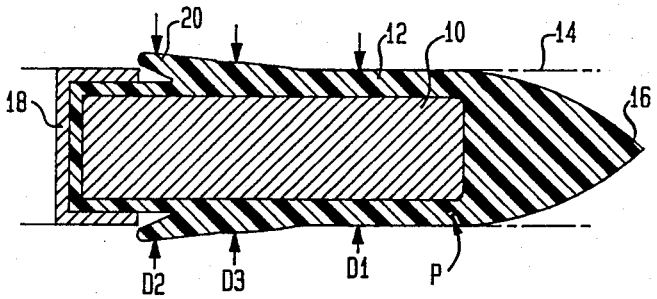
FIG. 1 is a longitudinal, sectional view of a projectile, according to the principles of the present invention.

Referring to FIG. 1, a projectile P is shown having a central load 10. This load may be a conventional explosive charge, having the usual triggering devices. Alternatively, for a training round, central load 10 may be a cylindrical ballast, formed of lead or other suitably dense material.

Central load 10, as shown and contained in a jacket 12, preferably formed of a plastic material, such as polychlorinated vinyl, although other materials, such as soft metals may be used. It is preferable that the material used for jacket 12 be relatively strong to withstand the high pressures and frictions experienced by a projectile P fired through a gun tube. It is also desirable, however, that the material have a sufficient amount of flexibility so that the rotating bands and appendages described hereinafter may deflect sufficiently to cause engraving and a reasonably tight gas seal. In this embodiment, the diameter of gun bore 14 is 30 millimeters, although the projectile P can be designed for other bore diameters. The forward end of jacket 12 is shaped into pointed nose 16. The aft end of jacket 12 is cylindrical, and is covered with a steel, cylindrical base 18. The jacket 12 may be formed by conventional molding techniques, wherein central load 10 is supported coaxially within the mold. Alternatively, jacket 12 may be injection molded, leaving the aft end open for subsequent insertion of central load 10. In the latter case, the aft end of jacket 12 can be sealed with an appropriate plastic cap, to form the integral structure shown as jacket 12 in FIG. 1.

Approximately three quarters of the way back from pointed nose 16, there is an appendage 20 in the form of an annular skirt. Skirt 20 is approximately 7 milimeters long and 3 millimeters thick, although the dimensions can be changed, depending upon the amount of deflection required, and the pressure of the high pressure gas. It will be noted that the center of the projectile P has a diameter D1, approximately equal to the inside diameter of gun tube 14. The outside diameter D2 of appendage 20 is significantly greater than diameter D1. This larger dimension allows appendage 20 to be pressed into the rifling of gun tube 14. The illustrated position of appendage 20 is approximately that expected prior to insertion of the projectile P into gun tube 14. After loading and prior to firing, however, appendage 20 will be driven inwardly somewhat. Diameter D3 of the Jacket 12 immediately forward of appendage 20 is of an intermediate size, and acts in a conventional way, as a rotating band. Thus, diameter D3 is sized somewhere between diameters D1 and D2.

Figure 2:
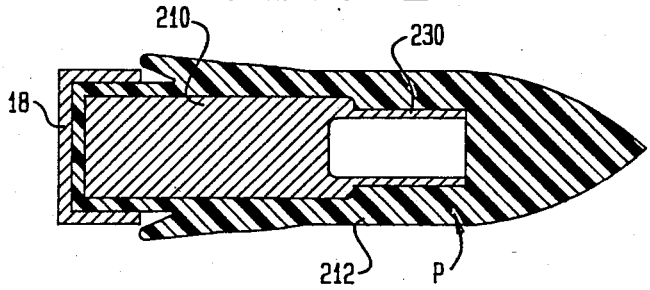
FIG. 2 is a longitudinal, sectional view of a projectile, having a forward hollow, which is an alternate to the projectile of FIG. 1.

Referring to FIG. 2, a projectile P essentially identical to that of FIG. 1 is shown, except that the forward end of the central load 210 is narrowed into a hollow container 230. This container 230 can be filled with an explosive material. The explosive chosen depends upon the mission. For training rounds, it may be a material designed to create a flash, smoke, or a substantial explosion. Jacket 212 has essentially the same outside dimensions as the first embodiment, but has a different hollow shaped to hold the central load 210.

In order to facilitate an understanding of the principles associated with the foregoing apparatus, its operation will now be briefly described. Initially, the projectile P can be loaded into gun tube 14, followed with a rearwardly located charge. Alternatively, the projectile P may be mounted onto a cylindrical cartridge having an explosive propellant. Upon firing, an explosive combustion gas bears against base 18, and thus the aft end of jacket 12 (FIG. 1). Additionally, explosive combustion gas bypasses base 18, and is applied directly against the underside of skirt 20. Since the underside of skirt 20 represents a relatively large surface area, skirt 20 is driven radially outward against the inside surface of tube 14. Accordingly, skirt 20 is driven to conform with the rifling of tube 14. This ensures that as projectile P moves forwardly, a spin is imparted to it. Furthermore, the engraving of skirt 20 into the rifling ensures a very tight gas seal, so that all of the energy of the high pressure gas can be efficiently applied to projectile P.

Figure 3:
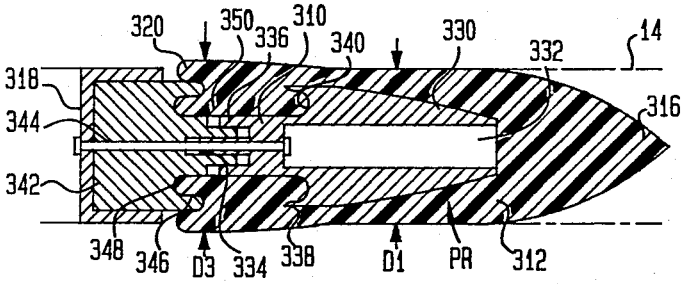
FIG. 3 is a longitudinal, sectional view of a projectile having telescoping parts, which are an alternate to that of FIG. 1.

Referring to FIG. 3, an alternate projectile PR is shown. In this embodiment, the central load 310 is in the form of a fustro-conical forward portion 330, surrounding a forward hollow 332. As before, this hollow 332 may contain an explosive charge. The aft end of the load 310 is a relatively narrow cylindrical section, having a coaxial, cylindrical boss 334, having a central bore. Encircling boss 334 is an annular wall 336. The transition between section 330 and the aft end of load 310 is formed into annular shoulder 338, which borders an annular groove 340. Slidably mounted about boss 334 is anvil 342, having a generally cylindrical shape. Anvil 342 has a coaxial bore, sized to engage boss 334. The end of anvil 342 directed towards boss 334 is stepped to conform with the walls and grooves in central load 310. Furthermore, the anvil 342 has a central bore sized to engage a securing pin 344. Accordingly, it will be noted that the anvil 342 and load 310 are spaced so that they can, under the circumstances described hereinafter, telescope together. The forward corner of anvil 342 is formed into a shoulder 346 that borders an annular groove 348. The aft end of anvil 342 is covered by a steel cap 318, having a coaxial hole through which pin 344 is placed. It will be noted that each end of pin 344 has a head to keep cap 318, anvil 342, and load 310 from separating.

Load 310 is surrounded by a jacket 312, which may be formed of material similar to jacket 12 of FIG. 1. Again, jacket 312 has a pointed nose 316, and a central portion having a diameter D1 sized to match the inside diameter of gun tube 14. The aft portion of jacket 312 is formed into a bulge, having diameter D3 of a sized to act as a rotating band. The jacket 312 has an internal ridge 350, shaped to conform to grooves 340 and 348.

Figure 4:
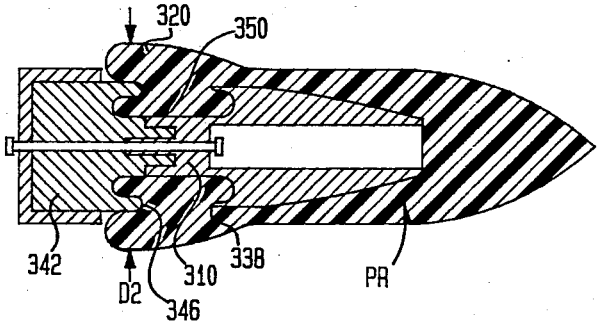
FIG. 4 is a longitudinal, sectional view of the projectile of FIG. 3, showing its anvil and load telescoped together.

To facilitate an understanding of the principles associated with the projectile of FIG. 3, its operation will be briefly described in conjunction with FIG. 4. The projectile PR is loaded into gun tube 14 in a fashion similar to that previously described for the projectile of FIG. 1. When loaded, the bulge 320 acts as a rotating band, engaging the rifling of the gun tube 14. Upon firing, a shock is imparted to the aft end of base 318 and anvil 342. Accordingly, anvil 342 tends to move forwardly first, causing it to telescope into load 310.

Once elements 342 and 310 telescope together, they are positioned as shown in FIG. 4. Consequently, shoulders 346 and 338 squeeze ridge 350. As a result, bulge 320 expands due to the extruding of material from ridge 350. Consequently, diameter D2 of the bulge 320 exceeds the prestressed diameter D3 (FIG. 3). Again, a relatively tight seal is formed by bulge 320, assuring that the the energy of the high pressure gas is not lost by bypassing bulge 320. Furthermore, bulge 320 conforms to the rifling of gun tube 14 to insure a spin is imparted to projectile PR.

It is to be appreciated that various modifications may be implemented with respect to the above described preferred embodiments. For example, the various materials can be altered depending upon the application. For example, various flexible materials can be used as a jacket, provided they have sufficient ability to withstand the high pressures and abrasive conditions experienced in the firing through a gun tube. Furthermore, the telescoping components are shown having a cylindrical boss mating a cylindrical bore. In other embodiments different shapes can be employed to allow telescoping. Furthermore, while the pointed nose and rotating band of the projectile is shown as an integral unit, in some embodiments various components can be connected together. Also, while a skirt is shown, in some embodiments the deformable section will not have a significant underside, but will have a substantial surface area exposed to high pressure gas to cause outward bulging. As previously noted, the load to be carried can vary, depending upon the particular mission and it is anticipated that various known loads can be mounted within the projectile.

Obviously, many modifications and variations of the present invention are possible in light of the above teachings. It is, therefore, to be understood that within the scope of the appended claims, the invention may be practiced otherwise than as specifically described.

What is claimed is:

1. A projectile for firing through a gun tube with high pressure gas comprising:

a central load;

a jacket encircling said load and having a rearwardly directed appendage flaring outwardly from said jacket, said appendage being formed of a flexible material for outwardly and radially deflecting in response to application of said high pressure gas.

2. A projectile according to claim 1, wherein said appendage is shaped as an annular skirt, forming an annular concavity against which said high pressure gas bears.

3. A projectile according to claim 2, wherein said skirt is formed of plastic material.

4. A projectile according to claim 1, wherein said jacket has a pointed nose.

5. A projectile according to claim 4 further comprising:

a base protectively covering the aft end of said jacket.

6. A projectile according to claim 1 further comprising:

an anvil coaxially and slidably mounted behind said load, said load and said anvil having opposing shoulders, said jacket having an internal ridge fitted between said opposing shoulders, whereby application of the high pressure gas against said anvil drives said shoulders together to expand said jacket outwardly.

7. A projectile according to claim 6, wherein said anvil is mounted to telescope into said load.

8. A projectile according to claim 7 wherein said jacket has an annular, outside bulge prior to telescoping said anvil and load together, said bulge encircling said ridge, said bulge expanding in response to the telescoping of said load and anvil.

9. A projectile according to claim 8 further comprising:

a coaxial pin connecting said anvil and load, and sized to permit them to slide axially a limited amount.

10. A projectile according to claim 9, wherein said opposing shoulders are annular and have annular grooves for gripping said ridge.

11. A projectile according to claim 1, wherein said central load has a hollow at its forward end.

12. A projectile according to claim 11, wherein said hollow contains explosive material.

13. A projectile for firing through a gun tube with high pressure gas, comprising:

a central load having an aft shoulder;

an anvil coaxially and slidably mounted behind said central load, said anvil having a forward shoulder opposing said aft shoulder of said central load;

a jacket encircling said load and having a flexible internal ridge fitted between said forward and aft shoulders, whereby application of said high pressure gas against said anvil drives said aft and forward shoulders together to expand said jacket outwardly.

14. A projectile according to claim 13, wherein said aft and forward shoulder are annular and have annular grooves for gripping said ridge.

15. A projectile according to claim 13, wherein said jacket has prior to driving said forward and aft shoulders together, an annular, deformable, outside bulge; said bulge encircling said ridge, said bulge being arranged to expand in response to the driving together of said forward and aft shoulders.

* * * * *